United States Patent [19]

Eikill et al.

[11] Patent Number: 5,167,029
[45] Date of Patent: Nov. 24, 1992

[54] DATA PROCESSING SYSTEM AND ASSOCIATED PROCESS USING MEMORY CARDS HAVING DATA MODIFY FUNCTIONS UTILIZING A DATA MASK AND AN INTERNAL REGISTER

[75] Inventors: Richard G. Eikill; Quentin G. Schmierer, both of Rochester, Minn.

[73] Assignee: International Business Machines Corporation, Armonk, N.Y.

[21] Appl. No.: 450,182

[22] Filed: Dec. 13, 1989

[51] Int. Cl.⁵ ............................................. G06F 13/00
[52] U.S. Cl. ............................... 395/425; 364/252.5; 364/958.2; 365/189.08
[58] Field of Search ... 364/200 MS File, 900 MS File; 365/189.05, 230.03, 189.08, 189.02; 395/425

[56] References Cited

U.S. PATENT DOCUMENTS

| | | | |
|---|---|---|---|
| 4,016,544 | 4/1977 | Morita et al. | 364/900 |
| 4,363,093 | 12/1982 | Davis et al. | 364/200 |
| 4,412,286 | 10/1983 | O'Dowd et al. | 364/200 |
| 4,520,439 | 5/1985 | Liepa | 364/200 |
| 4,569,016 | 2/1986 | Hao et al. | 364/200 |
| 4,570,222 | 2/1986 | Oguchi | 364/200 |
| 4,589,613 | 5/1986 | Duncan | 364/200 |

Primary Examiner—Glenn Gossage
Attorney, Agent, or Firm—Frederick W. Niebuhr; J. Michael Anglin

[57] ABSTRACT

A data processing network includes multiple processing devices, multiple memory cards of main storage, and a shared interface. Each of the memory cards includes memory arrays, an internal register for temporarily storing a data word read from the arrays, and logic circuitry. When one of the processing devices sends a set or reset command to one of the memory cards, the processor also sends a data mask. A data word to be modified is retrieved from a selected location in the memory arrays and latched into the internal register. The logic circuitry applies the data mask to a data word in the internal register, to modify the data word according to the data mask, then returns the data word to the selected location in the arrays.

15 Claims, 4 Drawing Sheets

DATA PROCESSING SYSTEM AND ASSOCIATED PROCESS USING MEMORY CARDS HAVING DATA MODIFY FUNCTIONS UTILIZING A DATA MASK AND AN INTERNAL REGISTER

BACKGROUND OF THE INVENTION

The present invention relates to information processing systems including multiple processors linked to multiple memory cards of main storage through a shared interface, and more particularly to a means for modifying data stored in main memory, with minimal impact upon the interface.

In recent years and throughout the computer industry, the performance of information processing devices has improved rapidly, particularly in terms of more rapid performance of data processing operations. Data processing systems increasingly employ multiple processing devices sharing a common interface for carrying out data transmissions between the processors and main storage which typically is composed of multiple memory cards. Improvements in memory subsystems have not kept pace with the improvements in processors, particularly when configurations of multiple, parallel processors are considered. Accordingly, system or network architectures have changed to compensate for a main storage which is relatively slow as compared to the processing devices. Cache memories and other techniques have been employed, in an attempt to uncouple the processors from the memory cards in main storage.

In connection with modifying data that resides in main storage, the traditional operation involves fetching the data from memory arrays to an internal register in a processor, modifying the data bits as required within the processor, then writing the modified data back into the memory arrays. This operation involves substantial system overhead. For example, the interface to main storage must be arbitrated for and acquired twice, once for a data fetch and once for storing data back into memory. If the interface is shared by multiple processors and by multiple cards of main storage, the time consumed in waiting for access to the interface is increased. A processor, upon gaining access to a particular memory card, must wait for the card to access its arrays to retrieve the data to be modified.

Techniques to more efficiently modify data in a memory are known. For example, U.S. Pat. No. 4,570,222 (Oguchi) discloses a data processing system with an information correcting function including a dynamic random access memory, a changing unit, a designating unit and a controller. The changing unit receives data from the RAM, and a selected portion of the data is modified within the changing unit, based on input from the designating unit.

In connection with color graphics displays, U.S. Pat. No. 4,016,544 (Morita et al) discloses a memory write-in control system, including a buffer memory for separately storing red, green and blue information for each of a multiplicity of dots. Each individual color unit receives a color designating input and a mask input from a write-in control unit which is controlled by a processor. If the mask bit is a logical one, the content is modified, while a logical zero in the mask bit leaves the corresponding contents unchanged.

There remains, however, a need to more effectively utilize processing devices, as well as a data bus joining multiple processing devices and main memory.

Therefore, it is an object of the present invention to provide a data processing system in which data in main storage is modified with substantially reduced use of an interface between main storage and multiple processors.

Another object of the invention is to transfer some of the logic circuitry involved in data modifying operations from the processors to the memory cards of main storage.

Another object is to increase the speed at which data modifying functions, including set and reset, are performed.

Yet another object is to provide a data processing system in which set and reset functions are performed on selected data in memory arrays, with just one access to the arrays being sufficient for these functions.

SUMMARY OF THE INVENTION

To achieve these and other objects, there is provided a data processing system including a processing device configuration for manipulating bit-encoded data, a memory having arrays for storing bit-encoded data as data words with each data word including a plurality of bits, and an interface connected to the processing configuration and to the memory, for transmitting bit-encoded data between the processing configuration and the memory. The processing configuration includes a means for generating a command to selectively modify a designated one of the data words. The processing configuration further includes means for generating address data corresponding to a selected location in the data arrays where the designated data word is stored.

The improvement in this system comprises a mask generating means in the processing device configuration, for generating a data mask corresponding to the designated data word, and for transmitting the data mask to the memory via the interface. A data manipulating means, within the memory, selectively modifies the designated data word according to the data mask after receiving the mask and the command. The data manipulating means includes: an intermediate data retaining means; a latching means, responsive to the command and address data, for locating the designated word in the arrays and transferring the designated word from the selected location to the intermediate data retaining means; a means for receiving the data mask and applying the mask to the designated data word when the word is contained in the intermediate data retaining means, to selectively modify the data word; and a write means for transferring the designated data word to the arrays, after the word has been modified.

Preferably, the processing device configuration includes a plurality of processing devices, each adapted to manipulate bit-encoded data and to generate commands. The memory can include a plurality of memory cards, each card with data arrays for storing bit-encoded data. The interface advantageously includes a data bus for transmission of the data mask, and a command bus for the transmission of the command and the address information. The data bus and command bus function in parallel, each shared by all of the processing devices and all of the memory cards.

Each of the memory cards can have its own internal register and memory arrays. The internal registers cooperate to provide the intermediate data retaining means.

Each memory card further can include logic circuitry associated with its internal register. In response to a set command, the data word to be modified and the data mask are provided as inputs to an OR logic gate, with the output of the OR gate returned to the data arrays on the card. Responsive to a reset command, the mask is first inverted, then the inverted mask and data word are provided as inputs to an AND logic gate, with the output of the AND gate returned to the data arrays.

The data words and data masks advantageously have the same predetermined number of bits. Accordingly there is a one-to-one correspondence between each data word and the mask employed in modifying it, enabling rapid modification of the data in a single read/modify/write cycle, accomplished with relatively straightforward circuitry.

With the internal registers and modifying logic residing on the memory cards, set and reset operations are atomic on the memory cards, in the sense that these operations are handled without any interruption from other commands to the memory card. Performing these operations largely within main storage frees each processor to perform other tasks during virtually all of the time involved in set and reset operations. The number of cycles required for each operation is reduced, as well as the time during which the interface or busses between the processors and main memory are occupied, thus achieving better system throughput. Finally, once a memory card initiates the modification, it remains dedicated to completing the set or reset function, without interference from interface traffic, array initialization overhead, or asynchronous memory refresh operations.

IN THE DRAWINGS

For a further appreciation of the above and other objects and advantages, reference is made to the following detailed description of the preferred embodiment and to the drawings, in which.

DETAILED DESCRIPTION OF THE PREFERRED EMBODIMENT

Figure 1:
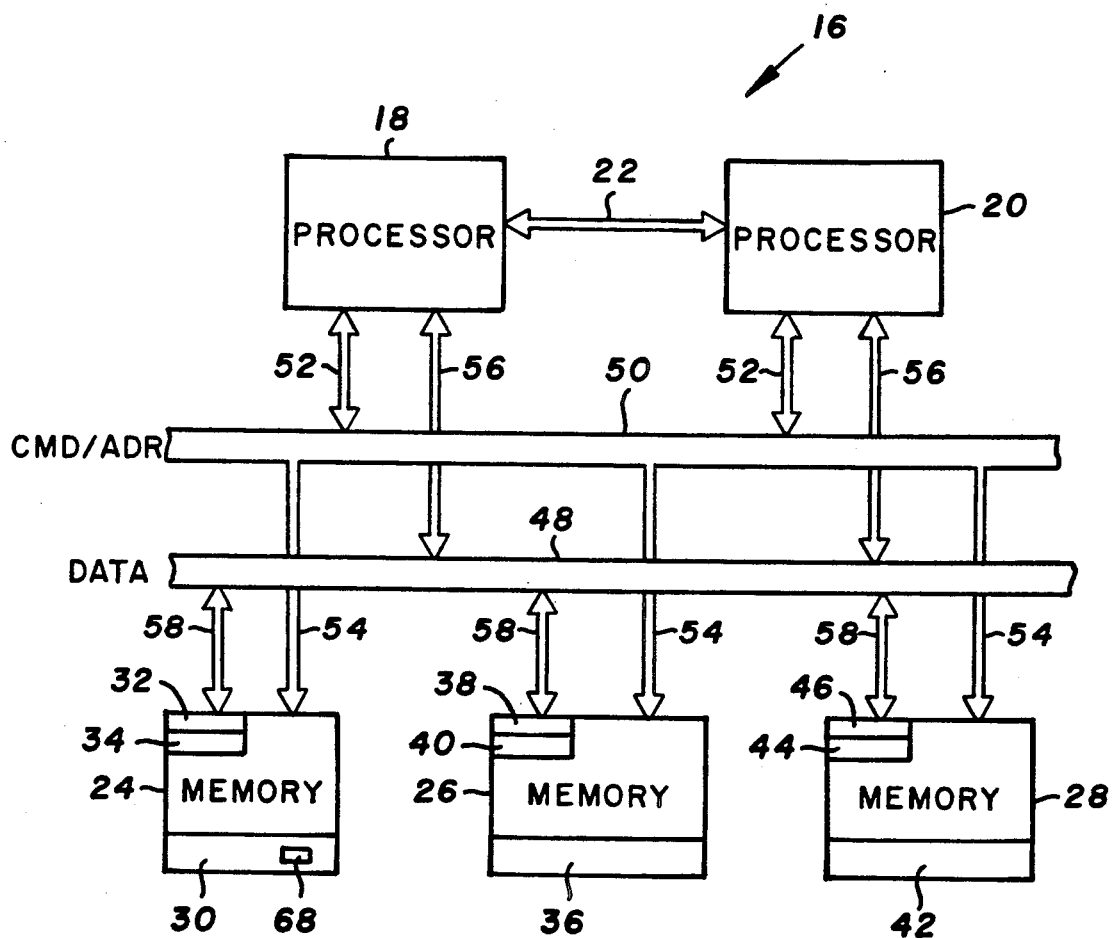
FIG. 1 is a schematic view of an information processing system in which a configuration of multiple processing devices is associated with main storage, including multiple memory cards, through a shared interface.

Turning now to the drawings, there is shown in FIG. 1 an information processing system 16 for storing and performing selected operations upon bit-encoded data. The system includes two processing devices, identified at 18 and 20, respectively. An arbitration link 22 joins the two processors, and is used in combination with arbitration logic residing in both processing devices to assign priority to either processor, in terms of access to the interface. It is to be understood that the configuration of processing devices in this network could consist of a single processing device or multiple processing devices in which multiple arbitration links are provided for a point-to-point connection of all processing devices.

An interface connects the processing devices with main storage, which includes multiple memory cards such as is indicated at 24, 26 and 28. Memory card 24, for example, includes memory arrays 30 for storing bit-encoded data, a buffer 32 for receiving data from the interface and for temporarily storing data for transmission to a selected one of the processing devices. Memory card 24 also includes an internal register 34 connected to memory arrays 30. Data stored in the memory arrays is loaded into internal register 34 for temporary intermediate storage, during which time the data can be modified according to instructions from one of the processing devices.

Memory cards 26 and 28 are similar to memory card 24, including memory arrays 36, a buffer 38 and an internal register 40, and memory arrays 42, an internal register 44 and buffer 46, respectively. Each of these components is substantially identical to and functions in the same manner as its counterparts in the other memory cards.

The interface associating the processors and memory cards includes a data bus 48 and a command/address bus 50, each joined to all processors and memory cards, and transmitting data independent of and in parallel with the other bus. Data bus 48 transmits what can conveniently be called working information, i.e. the information in which users of the system have the most interest. Command/address bus 50 transmits control information, relating to commands to fetch or store particular working data, and address information which identifies the location of particular working data in the memory arrays, or the location to which such data is to be sent.

Command lines 52, one for each processor, transmit command and address information to bus 50, from which one of command lines 54 forwards the information to the appropriate memory card. Command transfers are unidirectional (from a processor to a memory card), the arrows at both ends of command lines 52 indicating that each processing device, while transmitting a command, can inform the remaining processors that the command/address bus is occupied.

Data lines 56 between the processors and bus 48, and data lines 58 between the memory cards and the data bus, accommodate transmissions of working information in both directions. The interface includes further data paths not illustrated in FIG. 1, for controlling use of data bus 48, and also may include a commonly shared communication bus for transmitting status information relating to working data. For a further explanation of the interface, reference is made to U.S. patent application Ser. No. 07/445,320 entitled "High Performance Shared Main Storage Interface", filed Dec. 4, 1989 and assigned to the assignee of the present application.

Figure 2:
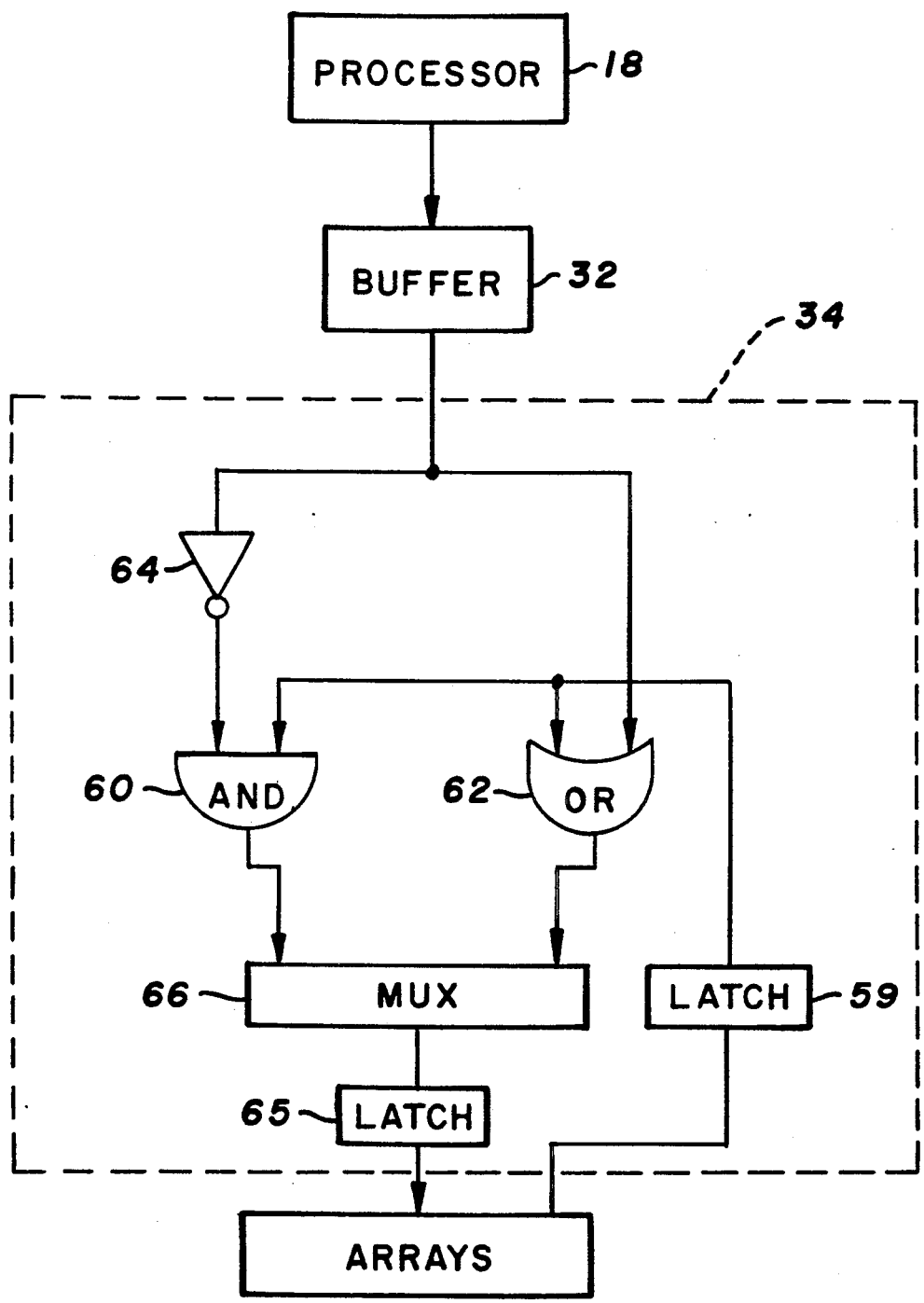
FIG. 2 is a schematic view of one of the memory cards showing data modification logic.

The internal registers in memory cards 24, 26 and 28 are particularly useful in modifying data stored in the respective memory arrays, without transferring data to the processing devices. Circuitry for modifying data is schematically illustrated in FIG. 2 for modifying a selected data bit. In this connection, it is to be appreciated that data in system 16 is transmitted and modified in the form of 8 byte data words, corresponding to the capacity of data bus 48. Thus, for any selected data word, the complete modification circuitry in the memory card would include substantially identical logic and multiplexing for each of the remaining data bits of the word, with all bits processed in parallel.

In FIG. 2, processor 18 provides a data mask used in modifying certain data stored in the memory arrays 30 of memory card 24. A latched (as at 59) output of the arrays is provided as one of the inputs to an AND logic gate 60, and as an input to an OR logic gate 62. The other input to the OR gate is the output of buffer 32. The buffer output also is provided to an inverter 64, and the inverted signal provided as the other input of AND gate 60. Outputs of the AND gate and the OR gate are provided to a multiplexer 66, the output of which is latched by a latch 65 and returns to memory arrays 30.

Thus, each of the memory cards includes circuitry for retrieving data from the data arrays and loading it into the internal register, receiving and applying the data mask to modify the data when in the internal register, and returning the modified data to the data arrays. A salient advantage of this approach is that circuitry for set and reset operations resides largely in the memory cards, rather than in the processor, for a substantial reduction in the number of clock cycles required to perform these operations.

This advantage becomes apparent upon comparing the prior art approach to modifying data, with a set or reset according to the present invention. Conventional, processor-controlled modification of data is illustrated in the timing diagram of FIG. 3. A fetch command, including address information corresponding to the location of the requested data in main memory, is sent from the processor to the memory card via the command/address bus during the first clock cycle.

The selected memory card begins to access its memory arrays in the second clock cycle. More particularly, access to the arrays is provided through two control lines, row address strobe (RAS) and column address strobe (CAS). The row address strobe initiates data array access by going active at the beginning of the second clock cycle, while the column address strobe goes active at the beginning of the third clock cycle. In connection with FIGS. 3 and 4, it should be noted that the row and column address strobes are shown to go high as they go active, for consistency with the remaining lines, namely processor command, processor data and array data. This is simply a matter of convenience in illustration. Actually, the row and column address strobes are "minus active" (active low), going active as the signal switches from the high to the low logic level.

In cycle four, data is read out of the arrays into the memory buffer. During the fifth clock cycle, data is transferred via the data bus to the processor, and the row and column address strobes go inactive. The processor modifies data during clock cycle six.

A store command from the processor during cycle seven is followed in the next cycle by transfer of the modified data back to the memory card, along with activation of the row address strobe. The column address strobe goes active during cycle nine and the modified data is returned to the arrays during clock cycles ten-twelve, after which the row address and column address strobes go inactive again. The "M" associated with array data in cycle twelve, refers to a modifying step which is not a set or reset, but rather an arrangement of the data into a form more suitable for storing in the arrays as opposed to a form suitable for transmission.

Figure 3:
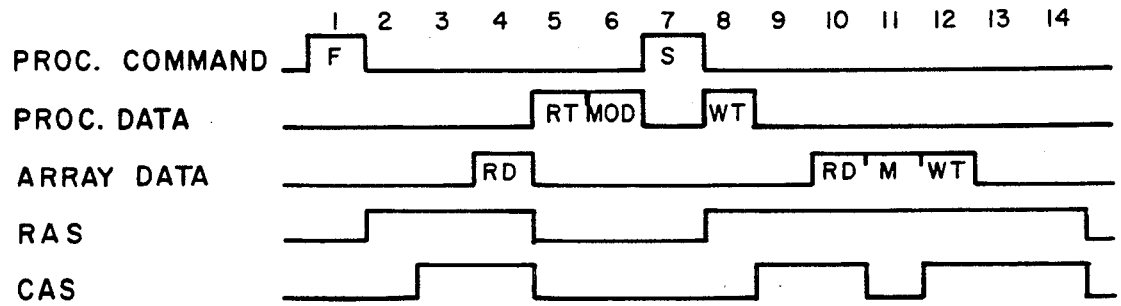
FIG. 3 is a timing diagram of a conventional data modifying operation.
Figure 4:
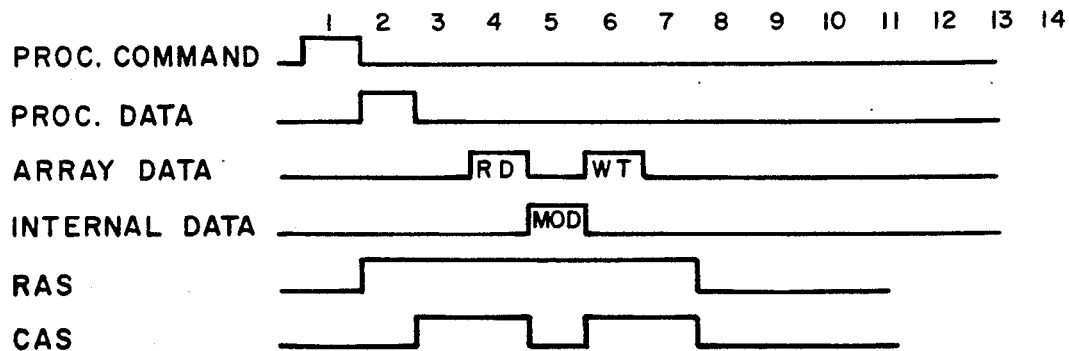
FIG. 4 is a timing diagram similar to that in FIG. 3, illustrating data modification according to the present invention.

FIG. 4 is a timing diagram similar to that in FIG. 3, showing data modification conducted primarily on the memory card, pursuant to a command from processing device 18 to modify certain data at a selected location 68 (see FIG. 1) within memory array 30 of memory card 24. Data bits are modified as parts of 8 byte words. For simplicity in illustration, however, data words having only 8 bits are shown in FIGS. 5 and 6, in connection with a set operation and a reset operation, respectively.

As seen in FIG. 4, processor 18 sends a command to memory card 24 via command/address bus 50. The command is either to "set" or to "reset" a data word 70 illustrated in FIGS. 5 and 6. Regardless of whether the command was a set or reset command, the processing device provides a data mask 72 to memory card 24 over data bus 48. The row address strobe becomes active during this cycle.

Figure 5:
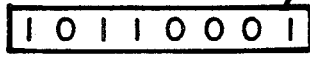
FIG. 5 is a representation of eight-bit data words, illustrating the set function.
Figure 6:
FIG. 6 is similar to FIG. 5, and illustrates the reset function.

FIGS. 5 and 6 show the same 8 bit mask 72, i.e. with logic "ones" in the third and seventh bit positions, and logic "zeros" in the remaining bit positions. Thus, in connection with a set command the bits of data word 70 in the third and seventh positions will be set to a logical one. For a reset command, these bits will be reset to a logical zero. In both cases, the remaining bits in the data word remain unchanged.

Returning to FIG. 4, the column address strobe becomes active at the beginning of the third cycle, and data is read from memory arrays 30 during cycle four. In contrast to FIG. 3, however, data is not read into buffer 32, but rather latched into internal register 34 of the memory card.

Data word 70 is modified during the fifth clock cycle. In the event that a set command was provided during the second clock cycle, the data word and mask 72 are applied as inputs to OR logic gates such as gate 62. The output of the OR gates is the modified (in this case set) data word 74. The third and seventh bit positions have been set, i.e. are logical ones. This represents no change for the third bit position, while the seventh bit, previously is zero, becomes a one. The remaining bit positions remain the same as for original word 70.

In the event the command in cycle two is a reset command, mask 72 is inverted to form an inverted mask 76. The inverted mask and the data word are then applied to eight AND gates such as gate 60. The output of the AND gates is the modified (in this case reset) data word 78, in which bits in the third and seventh positions have been reset, changing the bit in the third position in data word 70 to a logical zero, while the seventh bit position remains a logical zero. The other bit positions remain the same.

The modifying operation is completed during the sixth cycle, where the modified word is written from internal register 34 back into memory arrays 30, and specifically back to selected location 68.

Thus, the present invention substantially increases the speed of set and reset operations on data in the memory arrays, cutting the number of required clock cycles nearly in half. Efficiency is increased well beyond what this comparison would suggest, however, since these examples assume that the processors in each case required no time contending for use of the interface. In any configuration of multiple processors sharing a common interface, the processor involved must contend for use of the interface with main storage. The conventional data modification sequence (FIG. 3) requires the processor to gain access to the interface twice, once for fetching data from the memory card, and once for returning modified data. Processor 18 needs access to the interface only once, to provide the set or reset command and data mask to memory card 24.

This gives rise to another advantage, in that set and reset operations according to the invention require only half the amount of interface use, specifically one cycle to provide the set or reset command, and one cycle to provide the data mask. The conventional sequence requires four clock cycles of interface use.

Yet another advantage arises from the fact that the memory arrays are normally inactive, and require a predetermined number of clock cycles to become charged or ready for reading data from the arrays or writing data into them. The number of cycles needed of course varies with the nature of the arrays and the cycle time, but adds to the time required for any operation involving access to the arrays. The conventional data modify sequence requires access to the memory arrays first to read out data for a return to the processor, and later, after the row address and column address strobes have become inactive, to write in the modified data. By contrast, the designated data word in memory card 24 is modified in a single read/modify/write sequence of three consecutive clock cycles, with no need to reactivate the row address strobe, which controls activation of the memory arrays.

A final advantage, again in contrast to the conventional sequence, is that asynchronous events such as memory refresh do not interfere with data modify operations in the memory cards of network 16. Such events can delay the conventional data modify sequence, particularly if they occur between the fetch command and store command clock cycles. Thus, an information processing network in accordance with the present invention, in which the memory cards of main storage perform set and reset operations responsive to commands and masks from the processing devices, considerably reduces the time and interface usage required for set and reset operations.

What is claimed is:

1. A data processing system including a processing device configuration for manipulating bit-encoded data, a memory having arrays for storing bit-encoded data as a plurality of data words, each data word including a plurality of bits, and an interface connected to the processing configuration and to the memory, for transmitting bit-encoded data between the processing configuration and the memory; wherein the processing configuration includes a means for generating a command to selectively modify a designated one of the data words and for generating address data corresponding to a selected location in the data arrays where the designated data word is stored; said system further comprising:

a mask generating means, in the processing device configuration, for generating a data mask corresponding to the designated data word, and for transmitting the data mask to the memory via the interface; and a data manipulating means, within the memory, for selectively modifying the designated data word according to the data mask after receiving the data mask and the command, said data manipulating means including:
an intermediate data retaining means;
a latching means, responsive to said command and address data, for locating the designated word in the arrays and transferring the designated word from the selected location to the intermediate data retaining means;
a means for receiving the data mask and applying the data mask to the designated data word when said designated data word is contained in the intermediate data retaining means, to selectively modify the designated data word to provide a modified designated data word; and
a write means for transferring the modified designated data word to the arrays.

2. The data processing system of claim 1 wherein:
each of said data words has the same predetermined number of bits.

3. The system of claim 2 wherein:
said write means returns the modified designated data word to said selected location.

4. The system of claim 3 wherein:
said processing configuration includes a plurality of processing devices, each processing device including means for manipulating bit-encoded data and for generating commands, and wherein said memory includes a plurality of memory cards, each of the cards having data arrays for storing bit-encoded data.

5. The system of claim 4 wherein:
said interface includes a data bus for transmission of the data mask, and a command bus for transmission of the command and the address data, said data bus and command bus being shared in common by all of the processing devices and all of the memory cards.

6. The system of claim 5 wherein:
each of the memory cards has an internal register, and the intermediate data retaining means is comprised of the internal registers of the memory cards.

7. The system of claim 2 wherein:
the data masks have said predetermined number of bits.

8. The system of claim 7 wherein:
the command is one of a set command and a reset command.

9. The system of claim 8 wherein:
said memory includes a plurality of memory cards, each memory card having data arrays for storing bit-encoded data and an internal register, and the intermediate data retaining means is comprised of the internal registers of the memory cards; and
wherein each card further includes logic circuitry associated with its internal register, for providing the designated data word to be modified and the data mask as inputs to an OR logic gate to carry out said set command, for inverting the data mask to provide an inverted data mask, and for providing the designated data word to be modified and the inverted mask as inputs to an AND logic gate.

10. A process for selectively modifying data stored in a main storage means in a data processing system including a configuration of processors for manipulating bit-encoded data, a memory including said main storage means for storing bit-encoded data as a plurality of data words in which each data word includes a plurality of bits, and an interface connected to the configuration of processors and the memory for transmitting the bit-encoded data between the configuration of processors and the memory; said process including the steps of:
using the configuration of processors to generate a modify command for modifying bit-encoded data, address information corresponding to a selected location in the main storage means to designate a certain data word stored at the selected location as a designated data word to be modified, and a data mask identifying at least one bit in the designated data word to be modified;

transmitting the modify command, address information and data mask to the memory over the interface;

responsive to said modify command and address information, locating the designated data word and transferring the designated data word from the main storage means to an intermediate data retaining means in the memory; and applying the data mask to the designated data word contained in the retaining means, to selectively modify the designated data word according to the content of the data mask to provide a modified designated data word.

11. The process of claim 10 further including the step of:

returning the modified designated data word to the main storage means.

12. The process of claim 11 wherein:

the steps of transferring the designated data word to the intermediate retaining means, applying the data mask to the designated data word, and returning the modified designated data word to the main storage means, are all performed during a single read/modify/write cycle.

13. The process of claim 11 wherein:

said step of returning the modified designated data word to the main storage means includes transferring the modified designated data word to the selected location.

14. The process of claim 11 wherein:

said modify command is one of a set command and a reset command; and said step of applying the data mask to the designated data word includes the step of providing the designated data word and the data mask as inputs to an OR logic gate, whenever the command is a set command.

15. The process of claim 14 wherein:

said step of applying the data mask further includes the steps of inverting the data mask to provide an inverted data mask, and providing the inverted data mask and the designated data word to an AND logic gate, whenever the command is a reset command.

* * * * *